United States Patent [19]

Johnson

[11] 4,353,699

[45] Oct. 12, 1982

[54] THREE DIMENSIONAL EDUCATIONAL TOY MODEL SUBDIVISION

[76] Inventor: Burton R. Johnson, 208 Hunsaker La., Eugene, Oreg. 97404

[21] Appl. No.: 159,500

[22] Filed: Jun. 16, 1980

Related U.S. Application Data

[63] Continuation-in-part of Ser. No. 952,152, Oct. 17, 1978, Pat. No. 4,245,400, which is a continuation-in-part of Ser. No. 409,784, Oct. 26, 1973, abandoned.

[51] Int. Cl.³ .............................................. G09B 25/06
[52] U.S. Cl. ...................................... 434/72; 434/152
[58] Field of Search ................... 434/93, 72, 150, 151, 434/152; 46/1 R, 12, 16, 17, 202; 47/33, 66, 67, 69; 119/5; 405/270; 428/13; 273/32 R, 32 H, 258

[56] References Cited

U.S. PATENT DOCUMENTS

| 646,582 | 4/1900 | Murche | 434/152 |
|---|---|---|---|
| 1,393,163 | 10/1921 | Rasely | 434/151 |
| 1,462,179 | 7/1923 | Pfeifer et al. | 46/202 X |
| 1,924,721 | 8/1933 | Leubuscher | 405/270 |
| 2,061,631 | 11/1936 | Law | 47/30 |
| 2,751,880 | 6/1956 | Markowski | 119/5 |
| 2,942,354 | 6/1960 | Grain | 434/72 |
| 3,025,626 | 3/1962 | Schumacher | 35/41 X |
| 3,414,194 | 12/1968 | Seitzinger et al. | 46/17 X |
| 3,458,198 | 7/1969 | Delucia et al. | 273/258 X |
| 3,685,168 | 8/1972 | Reitz | 273/32 H X |
| 3,785,065 | 1/1974 | Kamm | 434/93 |
| 4,245,400 | 1/1981 | Johnson | 434/93 |

FOREIGN PATENT DOCUMENTS

| 478500 | 6/1929 | Fed. Rep. of Germany | 47/33 |
|---|---|---|---|
| 1000377 | 10/1951 | France | 47/66 |
| 311102 | 1/1956 | Switzerland | 47/33 |
| 742937 | 1/1956 | United Kingdom | 434/152 |

Primary Examiner—William H. Grieb

[57] ABSTRACT

A three dimensional toy for use in teaching the construction of a housing development which includes terrain of varying elevations, a roadway extending over the terrain, a plurality of building lots disposed adjacent the roadway, a first plurality of indicia disposed on the building lots for identifying their location and altitude, a second plurality of indicia disposed adjacent the roadway for identifying the parameters of the several curves defined by the roadway, and a third plurality of indicia disposed on the roadway for identifying vertical parameters and directional coordinates of the roadway.

3 Claims, 7 Drawing Figures

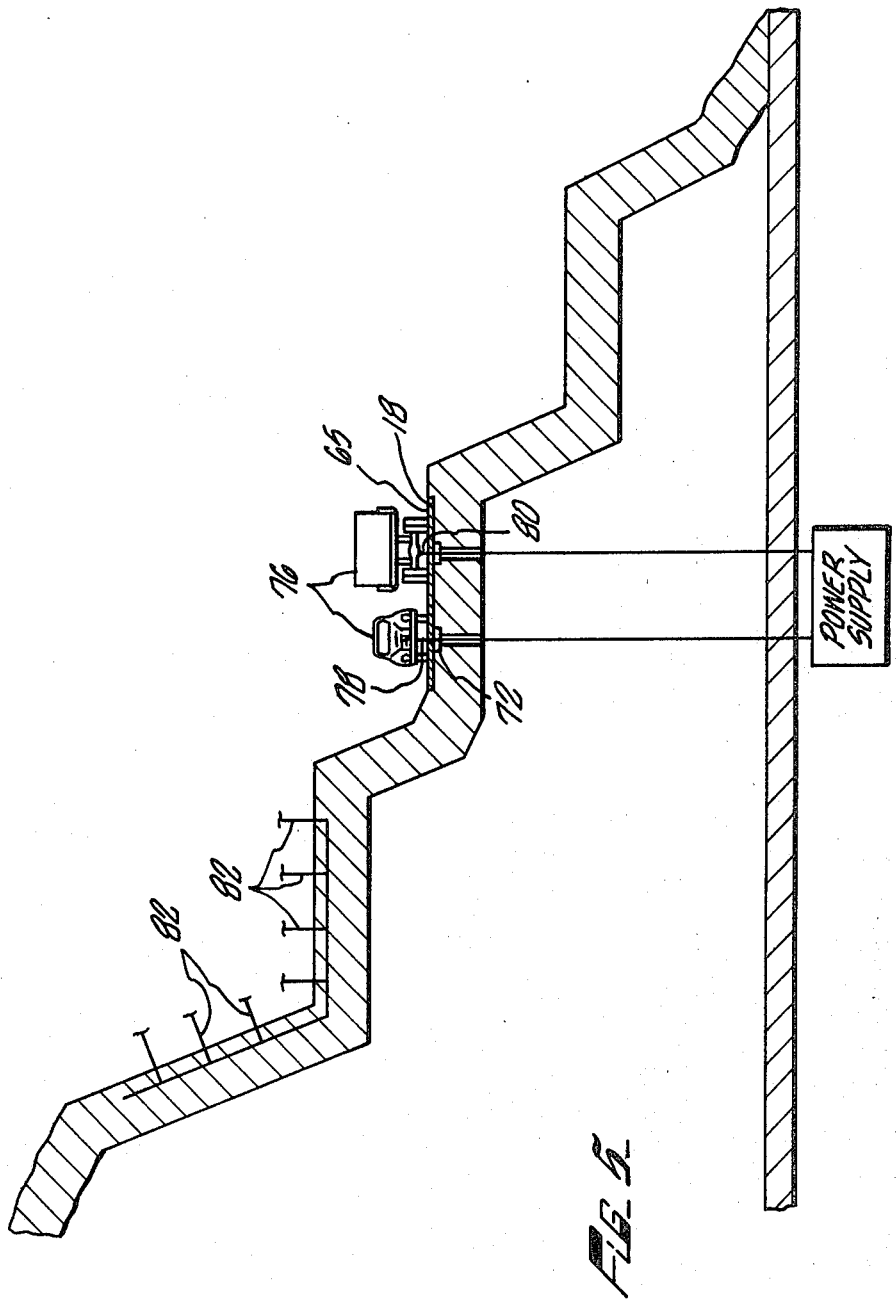

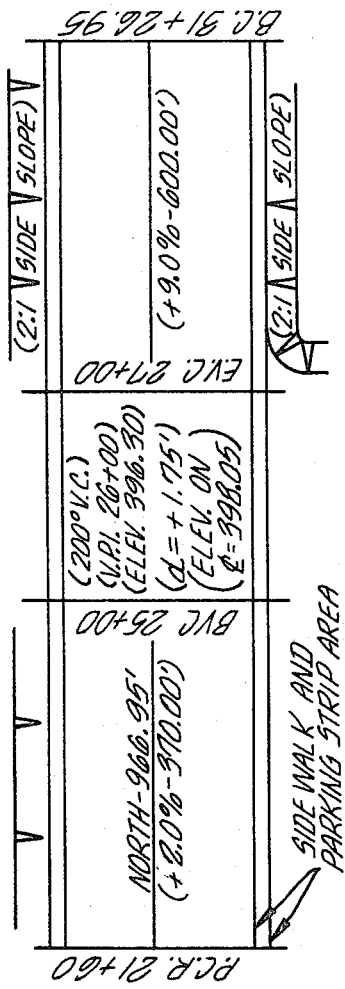
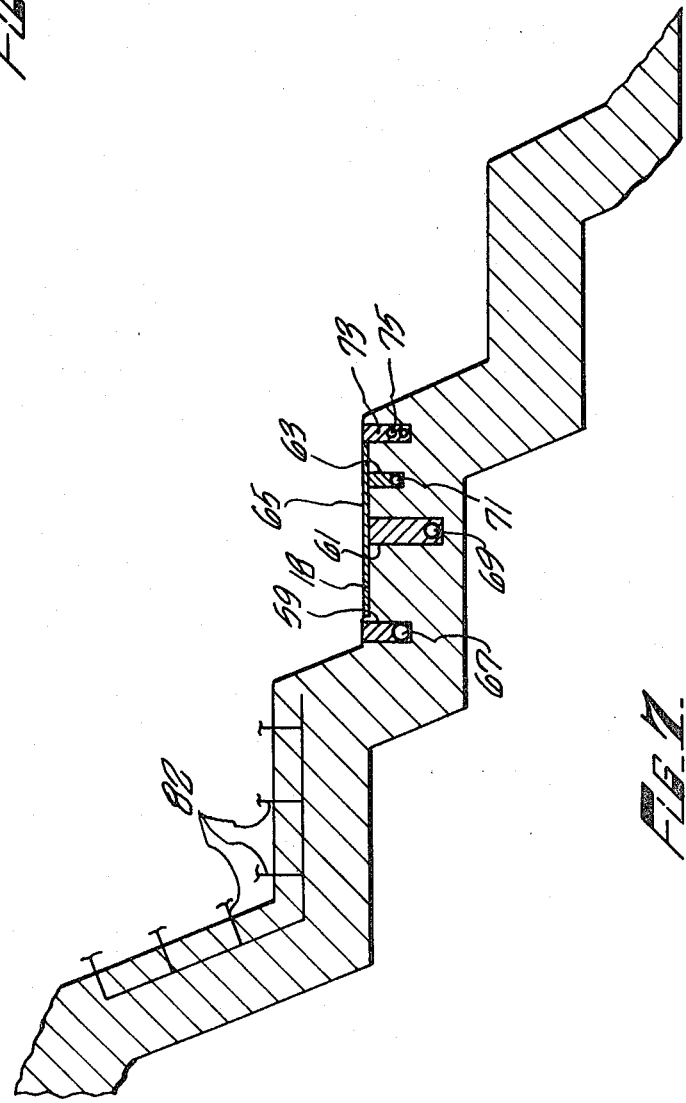

THREE DIMENSIONAL EDUCATIONAL TOY MODEL SUBDIVISION

This application is a continuation-in-part of application Ser. No. 952,152, filed by Burton R. Johnson on Oct. 17, 1978 for a three dimensional educational toy model subdivision, now U.S. Pat. No. 4,245,400 issued Jan. 20, 1981, which in turn is a continuation-in-part of application Ser. No. 409,784, filed on Oct. 26, 1973 for a toy-model living golf course subdivision, now abandoned.

BACKGROUND OF THE INVENTION

The present invention relates to an educational toy, and more particularly, to a three dimensional model for use in teaching the construction of a subdivision. Models simulating cities and housing developments are well known and have been used for many years both as toys and for various display purposes. Unlike mechanical models of cars, engines and the like which often employ moveable parts and function as an educational toy, such land development models have little educational value due to their lack of necessary realism to provide instruction in actual community and land development. Such models generally comprise nothing more than a fixed landscape with housings having predetermined mounting positions and do not provide any information corresponding to the landscape or its housing mounting positions and accordingly are of no educational value in teaching the actual design and layout of the community portrayed. An example of such a model is found in U.S. Pat. No. 1,393,163 issued to Rasely.

In contrast to such models which are really only of display value, applicant has developed a model which, due to its realism of land and community development, is highly educational in teaching one the various problems and considerations involved in designing and laying out a community development. In copending application, Ser. No. 952,152, of which this is a continuation-in-part, an unassembled kit model of this housing development was disclosed. Herein is described a preconstructed embodiment of the educational toy which is less expensive, and provides a simple, yet highly educational toy for teaching the actual design and layout of the community portrayed.

SUMMARY OF THE INVENTION

Briefly, the present invention comprises a three dimensional toy model simulating a housing subdivision for use in teaching the construction of the topography of the subdivision portrayed. The toy includes terrain of varying elevations, a roadway extending over the terrain and a plurality of building lots disposed adjacent to the roadway. Various indicia are provided on the toy for providing information pertaining to the location and altitude of the building lot and the surveying parameters of the curves defined by the roadway, thereby providing information to a builder with respect to relative positioning of building lots and the layout of a roadway which can be effectively employed over a given terrain.

It is therefore the principal object of the present invention to provide an educational toy simulating the realism of community development.

This and other objects and advantages of the present invention will become apparent from the following detailed description taken in conjunction with the accompanying drawings.

IN THE DRAWINGS

FIG. 3 is a chart listing the design characteristics of one of the horizontal curves defined by the roadway.

FIG. 4 is a chart illustrating the design characteristics of another of the horizontal curves defined by the roadway.

FIG. 5 is a sectional view of the roadway illustrating a pair of model vehicles disposed thereon and moved by an endless chain assembly.

FIG. 6 is a plan view of a portion of the roadway illustrating the various indicia printed thereon for identifying the vertical and directional parameters of the roadway.

FIG. 7 is a sectional view of the roadway illustrating the roadway, the roadway overlay, the topography adjacent the roadway, a storm line, sewer line, water line and sprinkler system.

DESCRIPTION OF THE PREFERRED EMBODIMENT

Figures 1, 2:
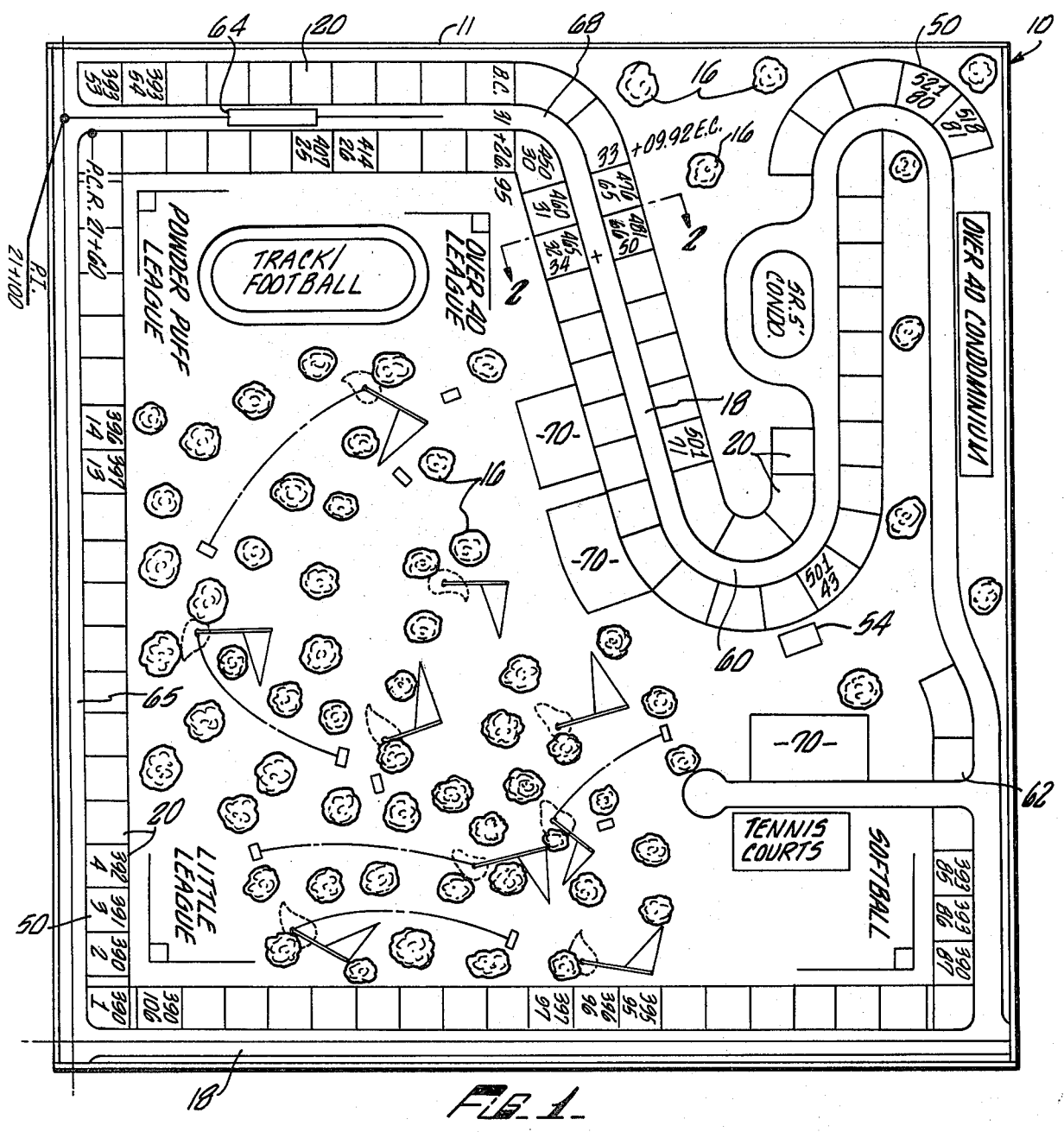
FIG. 1 is a top plan view of a typical development made in accordance with the present invention.
FIG. 2 is a sectional view taken along lines 2—2 of FIG. 1 illustrating two housing lots, a roadway disposed therebetween on terrain of varying elevations and a storm drain and water and sewer lines disposed beneath the roadway.

Referring now in detail to the drawings, the three dimensional toy 10 of the present invention is largely of single piece construction and is comprised of a sheet 11 which is molded or stamped to define the desired topography of the toy. The sheet 11 can be metal, fiber glass, plastic or any other material capable of maintaining its shaped configuration. The topography defined by the formed sheet varies in elevation and includes a single or plurality of roadways 18 and building pads or lots 20 which are disposed alongside of the roadways. While innumerable development designs may be incorporated utilizing the present invention, the development illustrated in the drawings is built around a golf course shown in the center of FIG. 1 with the roadway 18 surrounding the course. The golf course as well as other facilities such as the track and football field and tennis courts illustrated in the drawing can be painted or otherwise applied to the formed sheet 11.

As noted above, and as seen in FIG. 2, the elevation of the terrain in the educational toy is quite varied causing the building lots 20 disposed along the roadway 18 to be located at different elevations and the roadway itself to have different grades of incline. For example, the section of the topography of the layout illustrated in FIG. 2 defines a slope 26, a first building lot 28, a second slope 30, roadway 18, a third slope 32, a second building lot 34 below and on the opposite side of roadway 18 from lot 28 and a third slope 36. Indicia 50 is printed on each lot [such indicia being only shown in a few lots in the drawings] indicating the sequential number of the lot (1, 2, 3, 4, etc.) as well as the height or simulated altitude of the lot, thereby providing information to the builder with respect to the relative positioning of the lots which can be effectively employed over a given terrain. Referring to the indicia 50 in FIG. 1 which corresponds to the section of the topography illustrated in FIG. 2 at station 34+50 taken between the lots sequentially numbered 32 and 66, it can be seen that lot 24 (sequentially numbered 66 in indicia 50) is located 16 feet above lot 34 (sequentially numbered 32 in indicia 50), giving a house [not shown] built on lot 24, a view over roadway 18 and any house built on lot 34. Accordingly, by examining indicia 50 in combination with the land topography defined by sheet 11, one learns considerable information regarding grading and lot planning in the construction of a housing development or subdivision.

To provide the builder with additional information in construction of roadways, indicia 54 is provided at each turn in the roadway which includes the deflection angle [Δ] of the roadway would be indicated as well as the degree of curve [D], the radius of the curve [R] and, if desired, the tangential distance of the curve [T] (the distance from the beginning of the curve to the point of the intersection of the angle of the curve). Such information is provided by way of example for turn 60 in FIG. 3 and for turn 62 in FIG. 4. These dimensions are collectively defined herein as the parameters of the horizontal curve.

A third group of indicia 64 is printed on the roadway 18 setting forth the vertical and directional parameters thereof. FIG. 6 illustrates by way of example, indicia 64 appearing over the length of roadway extending between stations 21+60 and 31+26.95 which is located in the upper portion of FIG. 1 as indicated therein. In the preferred embodiment of the invention, indicia 64 (shown in detail in FIG. 6 only) include where applicable the vertical elevation of points along the roadway [Elev.]; the distance of a vertical curve [V.C.]; the location of the point where two differing grades come together, i.e., the vertical point of intersection [V.P.I.] and the distance in elevation between the point of intersection and an adjacent point on the roadway [d], the latter two designations being highly instructive in that they teach the need for a vertical curve, a smooth continuous incline, at the vertical point of intersection to avoid an abrupt irregularity in the roadway which would make travel thereover quite difficult for conventional vehicles. Indicia 64 also includes the grade on the center line; the percentage of grade for a given distance (e.g., 2% for 370 feet); the bearing or direction of the roadway at a given location (e.g., north—966.95). Further, points of particular significance in laying out the roadway are also set forth. These points include the location of the beginning of a curve [B.C.]; the point of curb return [P.C.R.]; the point of intersection [P.I., which is the point in the roadway where two sections of roadway having different horizontal parameters come together]; the location of the end of the curve [E.C.]; the point of the beginning of a vertical curve [B.V.C.]; the point of the end of a vertical curve [E.V.C.] as well as any significant points along the curve [P.O.C.]. To avoid any confusion with the horizontal or other parameters provided in the several indicia appearing on sheet 11, the vertical parameters including indicia 64 are preferably set forth in parentheses.

Thin street overlays 65 (see FIGS. 1 and 5) which could be constructed of a plastic material can also be provided in the preferred embodiment of the invention to simulate paving of the roadway 18. If such overlays are employed, each overlay would be provided with indicia corresponding to the indicia 64 set forth on roadway 18. To assist in the proper positioning of the overlays, one end of the first overlay used at the point of the beginning of construction should bear the designation P.O.B. and a corresponding designation should be included in indicia 64. The other end of that overlay would be identified by the point of intersection designation, P.I. The same designations would be found in indicia 64 along the roadway as seen at the left hand side of FIG. 1. A second overlay would then extend from the point of intersection at Station 21+00 (P.I. in the upper left hand corner of FIG. 1) to the beginning of the next curve 68 at Station 31+26.95 identified on the layout and overlay by the designation B.C. The third overlay in the roadway construction would then extend from B.C. to the end of the curve, designated E.C. on sheet 11 at Station 33+09.92, as the roadway is constructed clockwise about the housing development. Accordingly, as the builder proceeds to apply the overlays 65 to the roadway 18 about the terrain, he is put through the exercise of reviewing the percent of grade of the roadway and the parameters of each curve in the roadway thereby again exposing the builder to considerable information regarding the design and construction of the housing development. To impart further instructional benefit to the user of the toy, provisions can be made for storm drains, sanitary sewers and water lines beneath the roadway. As seen in FIG. 7, slots 59, 61 and 63 defining trenches can be provided in the roadway and desired locations which receive the storm drain line 67, the sewer line 69 and water line 71. If desired, a slot 73 can be provided just off the roadway for a T.V. cable line 75. Each of these slots can be filled with sand, sawdust or the like and/or covered with the street overlays 65.

While the above-described toy provides an excellent instructional aid for young persons in the development of topography for the construction of a housing development, additional realism can be imparted into the toy by the use of actual soil. In this embodiment of the invention, the single piece construction of the topography is retained but the sheet 11 is provided with a plurality of indentations such as the area designated 70 in FIG. 1. This area 70 is adapted to receive a quantity of soil which is shaped by the builder to conform to the overall topography of the development. These indentations are shaped so as to define upwardly sloping side wall portions which, when the soil is placed therein and formed so as to conform to the topography defined by sheet 11, retain said soil within the indented areas and in the desired contour. By varying the number and location of such indentations, the manipulation of the soil to conform to the overall topography of the housing development provides the builder with an additional educational tool. The use of such soil, while adding additional realism and educational value to the three dimensional toy does make the toy somewhat less suitable for indoor use by younger children and therefore defines a somewhat more advanced version of the educational toy.

If desired, still further realism can be imparted to the development by providing an endless chain 72 or pair of chains under the roadway 18 and, if employed, overlay 65 which are driven by conventional gearing and driving means. Model automobiles 76 are secured by suitable clip means 78 to the chain and moved along the road by the endless chain. Small slots 80 would be provided in the roadway to accommodate clip means 78, or alternatively, magnetic clips might be employed to obviate the need for slots 80. While the addition of these moving models is not needed for applicant's constructional development toy, additional realism and enjoyment could be provided by their use. Similarly, model sprinkling systems 82 (see FIGS. 5 and 7) can be provided on sheet 11 as well as small model homes of different styles (e.g., English, gable roof, hip roof, Spanish, etc. not shown). While the possible additions to this toy are numerous, the embodiment described provides a device which through the interaction of the materials provided and printed information is highly instructional in the development of housing subdivisions.

Various changes and modifications may be made in carrying out the present invention without departing from the spirit and scope thereof. Insofar as these changes and modifications are within the purview of the appended claims, they are considered part of the present invention.

I claim:

1. A three dimensional toy for use in teaching the construction and topography of a housing subdivision, said toy comprising a sheet of material formed so as to define a varying topography of said housing subdivision, said topography including a roadway of varying elevation having a plurality of curves therein and a plurality of housing lots disposed alongside said roadway, a first plurality of indicia printed on said sheet indicating the relative position and elevation of each of said housing lots and a second plurality of indicia on said sheet indicating one or more of the surveying parameters of each of said curves in said roadway such that upon comparing the relative positions and locations of said roadway and said building lots with said first and second plurality of indicia, one is instructed in the topography of a housing subdivision, a third plurality of indicia printed on said sheet for identifying the sequential development of said roadway, and a plurality of overlays adapted to be disposed over and secured to said roadway, said overlays having indicia printed there-on corresponding to said third plurality of indicia for indicating the positioning of said overlay on said roadway such that upon comparing said first and second pluralities of indicia with such third plurality of indicia, one is instructed in the construction of a roadway over a varying topography and about a plurality of building lots positioned on said topography.

2. A three dimensional toy for use in teaching the construction and topography of a housing subdivision, said toy comprising a sheet of material formed so as to define a varying topography of said housing subdivision, said topography including a roadway of varying elevation having a plurality of curves therein and a plurality of housing lots disposed alongside said roadway, a first plurality of indicia printed on said sheet indicating the relative position and elevation of each of said housing lots, a second plurality of indicia on said sheet indicating one or more of the surveying parameters of each of said curves in said roadway, a third plurality of indicia printed on said sheet for identifying the sequential development of said roadway, a plurality of overlays adapted to be disposed over and secured to said roadway, said overlays having indicia printed thereon corresponding to said third plurality of indicia for indicating the positioning of said overlays on said roadway, such that upon comparing the relative positions and locations of said roadway and said building lots with said first and second plurality of indicia, one is instructed in the topography of a housing division and upon comparing said first and second indicia with said third indicia, one is instructed in the construction of a roadway over a varying topography and about a plurality of building lots positioned on said topography, and, a plurality of indented areas on said sheet adapted to receive a quantity of soil, said areas being shaped so that upon forming said soil to the configuration of said topography, said soil is retained within said indented areas.

3. A three dimensional toy for use in teaching the construction of the topography of a housing subdivision, said toy comprising a sheet of material formed so as to define a varying topography of said housing subdivision, said topography including a roadway of varying elevation having a plurality of curves therein and a plurality of housing lots disposed along both sides of said roadway and at varying elevations, a first plurality of indicia printed on said housing lots indicating the relative position and elevation of said housing lots, a second plurality of indicia printed on said sheet adjacent each of the curves defined by said roadway indicating one or more of the surveying parameters of each of said curves in said roadway, a third plurality of indicia printed on said sheet identifying the sequential development of said roadway, a plurality of overlays adapted to be disposed over said roadway, and a fourth plurality of indicia printed on said overlays, said fourth plurality of indicia corresponding to said third plurality of indicia printed on said sheet for indicating the proper sequential disposition of said overlays along said roadway such that upon disposing said overlays upon said roadway and comparing the relative position and location of said roadway and said building lots with said first, second and fourth plurality of indicia, one is instructed in the construction of the topography of a housing subdivision and the construction of a roadway over varying topography and about a plurality of building lots positioned on said topography.

* * * * *